United States Patent [19]

Nishino et al.

[11] Patent Number: 5,739,205
[45] Date of Patent: Apr. 14, 1998

[54] α-CYANOACRYLATE ADHESIVE COMPOSITION

[75] Inventors: Yukinori Nishino, Osaka; Chiaki Hata, Ibaraki, both of Japan

[73] Assignee: Taoka Chemical Company, Limited, Osaka, Japan

[21] Appl. No.: 699,871

[22] Filed: Aug. 20, 1996

Related U.S. Application Data

[63] Continuation-in-part of Ser. No. 456,312, Jun. 1, 1995, abandoned.

[30] Foreign Application Priority Data

Jun. 8, 1994 [JP] Japan ................................. 151656/94

[51] Int. Cl.⁶ ..................................................... C08K 5/16
[52] U.S. Cl. ........................ 524/555; 524/556; 524/560; 524/564; 524/492; 524/833; 524/850; 524/853; 524/854
[58] Field of Search ..................... 524/555, 556, 524/557, 560, 564, 565, 762, 850, 492, 833, 853, 854

[56] References Cited

U.S. PATENT DOCUMENTS 4,845,151  7/1989  Sivy .......................................... 524/555

FOREIGN PATENT DOCUMENTS

| | | |
|---|---|---|
| 0 151 527 | 8/1985 | European Pat. Off. . |
| 0 209 067 | 1/1987 | European Pat. Off. . |
| 0 323 720 | 7/1989 | European Pat. Off. . |
| 0390 402 | 10/1990 | European Pat. Off. . |
| 2 506 777 | 12/1982 | France . |
| 2 691 714 | 12/1993 | France . |

*Primary Examiner*—Vasu Jagannathan
*Assistant Examiner*—Olga Asinovsky
*Attorney, Agent, or Firm*—Antonelli, Terry, Stout, & Kraus, LLP

[57] ABSTRACT

An α-cyanoacrylate adhesive composition having high thixotropy, excellent stability with age including difficulty of separation and excellent adhesiveness, for use of rubbers, plastics, metals or so, comprises (b) 10 through 20 parts by weight of polymers containing alkyl methacrylate having a weight average molecular weight of 100,000 through 300,000, (c) 2 through 20 parts by weight of ultrafine anhydrous silica, and (d) 0.001 through 20 parts by weight of quick curing additives represented by the formula (1), (b)–(d) being on the basis of (a) 100 parts by weight of α-cyanoacrylates:

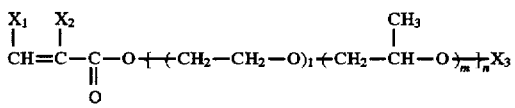

(1)

wherein $X_1$ is a hydrogen atom or methyl group; $X_2$ is a hydrogen atom, methyl group or cyano group; $X_3$ is $R_2$ or $R_2CO$ in which $R_2$ represents a hydrocarbon residue containing no anionically polymerizable group; and l, m and n are integers and $(l+m) \geq 1$ and $n \geq 1$.

6 Claims, No Drawings

α-CYANOACRYLATE ADHESIVE COMPOSITION

This is a continuation-in-part of U.S. application, Ser. No. 08/456,312 filed Jun. 1, 1995 now abandoned.

The present invention relates to an α-cyanoacrylate adhesive composition having high thixotropy, excellent stability with age and excellent adhesiveness.

α-Cyanoacrylates have been widely used as instantaneous adhesives for adhesion of rubbers, plastics, metals, glasses and woods, since α-cyanoacrylates easily polymerize anionically, or polymerize and cure in a short period of time without any catalysts or heating, only in the presence of anionic activators such as moisture or alkaline substances present on surfaces of solid substrates or in air. One of problems encountered when α-cyanoacrylate adhesives that flow easily are applied is that uniform coating on inclined planes is hardly obtained. Another problem is poor adhesion encountered when an application is made on porous substrates, for example, woods or leathers, because the adhesives penetrate into the surface of the substrates. One of approaches in order to dissolve these problems is that polymer thickeners are blended with α-cyanoacrylate adhesives in order to increase viscosity. Although there was some improvement in penetration in the surface of porous substrates, there were problems left undissolved yet. That is, an amount of additive thickeners is limited because of solubility. Jelly-like products are hardly obtained after a little excessive amount of the thickeners is added. Too large amount of the thickners causes spinnability and α-cyanoacrylates obtained are not satisfactory in various properties. An other approach is that ultrafine anhydrous silica is blended with and dispersed in α-cyanoacrylate adhesives in order to give high thixotropy thereto and improve flowability and penetration.

However, conventional technologies, i.e., blending ultrafine anhydrous silicas or blending a small amount of thickeners thereto, cause separation while the composition is stored. That is, flowable liquid of low viscosity lies on a highly thixotropic layer. After this separation occurs, the easily flowable liquid is discharged when the adhesive composition is discharged from a vessel, until poor adhesion results. Usefulness as a highly thixotropic composition is severely damaged.

U.S. Pat. No. 4,845,151 (Sivy), Example 1, mentions an α-cyanoacrylate adhesive composition which comprises 88.9 parts of α-cyanoacrylate and 5.66 parts of poly(methyl methacrylate) as a thickener, 1.18 parts of polypropylene glycol dimethacrylate (molecular weight: 620) as a quick curing additive and 4.25 parts of fumed silica (subjected to no surface treatment).

U.S. Pat. No. 4,837,260 (Sato et al), e.g., Example 6, mentions an α-cyanoacrylate adhesive composition which comprises 87.3 parts of α-cyanoacrylate and 2.7 parts of PMMA (poly(methyl methacrylate)) as a thickener, 0.1 part of polyethylene glycol #400 as a quick curing additive and 10 parts of hydrophobic silica (AEROSIL, trade name, R972).

U.S. Pat. No. 4,477,607 (Litke), column 2, lines 55–56, mentions an α-cyanoacrylate adhesive composition which comprises α-cyanoacrylate containing 6% of polymethyl methacrylate having a weight average molecular weight of 0.4–0.5 million and additionally comprises, for example, hydrophobic silica (AEROSIL, trade name, R805).

However, these conventional methods are not satisfactory yet for obtaining α-cyanoacrylate adhesive compositions having high thixotropy aimed at by the present invention.

The object of the present invention is to provide an α-cyanoacrylate adhesive composition in which all of the above-mentioned problems have been solved. That is, the α-cyanoacrylate adhesive composition of the present invention has high thixotropy, excellent compatibility, dispersibility and storage stability with little separation phenomenon, and excellent adhesion strength.

As the result of intesive research conducted by the present inventors, it has been found that all of the above problems can be solved by the composition specified in the present invention, namely, by using a specific methacrylic copolymer as a thickener and a specific polymer as a quick curing additive.

According to the present invention, an α-cyanoacrylate adhesive composition comprises (b) 10 through 20 parts by weight of polyalkyl methacrylates having a weight average molecular weight of 100,000 through 300,000, or copolymers of alkyl methacrylates and other methacrylates or acrylates, said copolymers having the same average molecular weight as that of polyalkyl methacrylates, (c) 2 through 20 parts by weight of ultrafine anhydrous silicas and (d) 0.001 through 20 parts by weight of quick curing additives represented by the following formula (1), (b)–(d) being on the basis of (a) 100 parts by weight of α-cyanoacrylates:

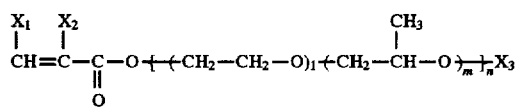

(1)

wherein $X_1$ is a hydrogen atom or methyl group; $X_2$ is a hydrogen atom, methyl group or cyano group; $X_3$ is $R_2$ or $R_2CO$ in which $R_2$ represents a hydrocarbon residue containing no anionically polymerizable group; and l, m and n are integers and $(l+m) \geq 1$ and $n \geq 1$.

The feature of the present invention resides in finding that the object of the present invention can be attained at the same time by using polymers represented by the formula (1) as the quick curing additives and, further, by using a specific amount of polyalkyl methacrylates or copolymers thereof having a relatively small weight average molecular weight as the thickeners.

The quick curing additives used in the present invention are polyalkylene glycol monoether monoesters represented by the formula (1). As examples thereof, mention may be made of acrylates, methacrylates, crotonates or α-cyanoacrylates of glycol monoether compounds such as methylcarbitol, carbitol, diethylene glycol monoethyl ether, diethylene glycol monomethyl ether, polyethylene glycol monomethyl ether, polyethylene glycol monoethyl ether, tetraoxyethylene glycol monomethyl ether, polyoxyethylene glycol monolauryl ether, or polyoxyethylene glycol monononylphenyl ether.

An amount of addition of these quick curing additives is 0.001–20 parts by weight, preferably 0.005–5 parts by weight on the basis of 100 parts by weight of the α-cyanoacrylates.

The present polymer component (b), i.e., polyalkyl methacrylates or copolymers of alkyl methacrylates and other methacrylats or acrylates are those having a weight average molecular weight of 100,000 through 300,000, preferably 120,000 through 200,000.

Examples of polyalkyl methacrylates (I) are lower alkyl esters of polymethacrylic acid. Mention is made of, for example, polymethyl methacrylate, polyethyl methacrylate, polypropyl methacrylate or polybutyl methacrylate. In the copolymers (II) of (i) alkyl methacrylates and (ii) acrylates or other methacrylates excluding the (i) alkyl methacrylates. examples of acrylate ester monomers or methacrylate ester monomers excluding the alkyl methacrylates are methyl methacrylate, ethyl methacrylate, n-propyl methacrylate, iso-propyl methacrylate, n-butyl methacrylate, iso-butyl methacrylate, n-hexyl methacrylate, n-heptyl methacrylate, n-octyl methacrylate, 2-ethylhexyl methacrylate, nonyl methacrylate, methoxyethyl methacrylate, methoxypropyl methacrylate, ethoxyethyl methacrylate, ethoxypropyl methacrylate, allyl methacrylate, tetrahydrofurfuryl methacrylate, methyl acrylate, ethyl acrylate, n-propyl acrylate, iso-propyl acrylate, n-butyl acrylate, iso-butyl acrylate, n-hexyl acrylate, n-heptyl acrylate, n-octyl acrylate, 2-ethylhexyl acrylate, nonyl acrylate, methoxyethyl acrylate, methoxypropyl acrylate, ethoxyethyl acrylate, ethoxypropyl acrylate, allyl acrylate or tetrahydrofurfuryl acrylate. These esters may be used each alone or in admixture of two or more. An amount of the other esters in the copolymers is usually not more than 50% by mol, preferably not more than 25% by mol.

An amount of addition of the polymer component (b), i.e., polyalkyl methacrylates or copolymers of alkyl methacrylates and other methacrylates or acrylates is important and 10 through 20 parts by weight, preferably 12 through 17 parts by weight on the basis of 100 parts by weight of the α-cyanoacrylates.

Various difficulties are encountered when quick curing additives used do not meet the requirements of the present invention or when thickeners used do not meet the requirements of the present invention with resepct to the weight average molecular weight and the amount of addition. Specifically, as explained hereinafter in examples and comparative examples, high thixotropy which is a feature of the present invention cannot be obtained, or there are brought about unfavorable results in separation in layers during storage, compatibility or dispersion stability (dispersibility) during preparation, viscosity stability (storage stability) and thread-formation.

The most preferable embodiment of the present invention is a composition comprising (b) 10 through 20 parts by weight of polymers, i.e., (I) polyalkyl methacrylates or (II) copolymers of alkyl methacrylates and other methacrylates or acrylates, said polymers (I) or (II) having a weight average molecular weight of 100,000 through 300,000, (c) 2 through 20 parts by weight of ultrafine anhydrous silicas and (d) 0.005 through 20 parts by weight of quick curing additives represented by the formula (1), (b)–(d) being on the basis of (a) 100 parts by weight of α-cyanoacrylates.

The (a) α-cyanoacrylates have the formula (2):

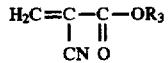

(2)

wherein $R_3$ is a hydrocarbon residue having 1 through 16 carbon atoms, and may be substituted. Examples of $R_3$ are methyl, ethyl, n-propyl, i-propyl, n-butyl, i-butyl, sec-butyl, octyl, neopentyl, ethylhexyl, dodecyl, allyl, methoxyethyl, ethoxyethyl, methoxypropyl, benzyl, phenyl or chloroethyl residue. One or more in blended of the α-cyanoacrylates may be used.

Examples of the (c) ultrafine anhydrous silicas are, for example, hydrophilic silicas or hydrophobic silicas. Examples of the hydrophilic silicas are Aerosil (trade name) 130, 200, 300, 380, etc. manufactured by Nippon Aerosil, having specific surface areas of 130±25 m²/g, 200±25 m²/g, 300±30 m²/g and 380±30 m²/g, respectively; Reolosil (trade name) QS-10, QS-20, QS-30, QS-40, etc. manufactured by Tokuyama Co. having specific surface areas of 140±20 m²/g, 220±20 m²/g, 300±30 m²/g and 380±30 m²/g, respectively; and those manufactured by DEGUSSA, Germany and CABOT, USA.

Examples of the hydrophobic silicas are Aerosil (trade name) R972, RX200, RY200, etc. manufactured by Nippon Aerosil, which are obtained after surface treatments of hydrophilic silicas with a $CH_3$ group, trimethylsilyl group and dimethylsilicone oil, respectively, and having specific surface areas of 110±20 m²/g, 140±25 m²/g and 100±20 m²/g, respectively; Aerosil (trade name) R202, R805, R812, etc. manufactured by Nippon Aerosil, which are obtained after treatments of hydrophilic silicas with dimethylsilicone oil, n-octyltrimethoxy-silane and trimethylsilyl residue, respectively, and having specific surface areas of 100±20 m²/g, 150±25 m²/g and 260±30 m²/g, respectively; Reolosil (trade name) MT-10, DM-20, HM-205, etc. manufactured by Tokuyama Co. which are obtained after treatments of hydrophilic silicas with monomethyltrichlorosilane, dimethydichlorosilane, and hexamethyldisilazaone, respectively, and having specific surface areas of 120±10 m²/g, 180±20 m²/g, and 145=20 m²/g, respectively; and those manufactured by DEGUSSA, Germany and CABOT, USA. These silicas may be used alone or in mixtures.

An amount of (c) ultrafine anhydrous silicas is 2 through 20 parts, preferably 4 through 15 parts by weight, on the basis of 100 parts by weight of the α-cyanoacrylates. The specific surface area of the ultrafine anhydrous silicas is related with curing rate. The smaller the specific surface area is, the faster the curing rate is, as a rule.

In addition, various additives may be blended depending on the purpose of products as long as stabilty of α-cyanoacrylate monomer is not impaired. The additives may include: stabilizers that have been conventionally used for α-cyanoacrylate adhesives, such as inhibitors for anionic polymerization, for example, sulfur dioxide, methanesulfonic acid, p-toluene sulfonic acid, boron trifluoride diethyl ether, $HBF_4$ or trialkylborate; inhibitors for radical polymerization, for example, hydroquinone, hydroquinone monomethyl ether, t-butyl catechol, catecohl or pyrogallol; plasticizers, for example, dimethyl phthalate, diethyl phthalate, dibutyl phthalate, 2-ethylhexyl phthalate or diisodecyl phthalate; or others such as colorants, perfumes, solvents, strength improvers, aliphatic polyvalent carboxylic acids, or aromatic polyvalent carboxylic acids. One or more of other known various thickeners which are used in combination with the cyanoacrylate may be used. They include acrylic rubbers, polyvinyl chloride, polystyrene, cellulose ester, polyalkyl-α-cyanoacrylate or ethylene-vinyl acetate copolymer. The α-cyanoacrylate adhesive composition according to the present invention has high thixotropy and maintains for a long period of time the characteristics of so-called gel type cyanoacrylate adhesives or jellylike cyanoacrylate adhesives. In particular, the α-cyanoacrylate adhesive composition according to the present invention is improved in stability, i.e., whether separation in layer occurs during storage; dispersibility or compatibility and dispersion stability when the composition is prepared, viscosity stability when stored, or thread formation. The present adhesive composition has excellent performances during the preparation process, the application process and after the application. The present adhesive is good in adhering metals, plastics, rubbers or woods, in particular adhering porous materials, inclined plane or parts having large void.

EXAMPLE 1

To ethyl-α-cyanoacrylate (100 parts by weight) containing 30 ppm of $SO_2$ and 2,000 ppm of hydroquinone were added a methyl methacrylate/methyl acrylate (100/1) copolymer (14 parts by weight, weight average molecular weight: 150,000, a thickener) and monomethacrylate of polyethylene glycol (400) monomethyl ether (0.1 part by weight, a quick curing additive). After being thoroughly stirred, Aerosil 130 (5 parts by weight) was added. The mixture was uniformly dispersed with a disperser to prepare an adhesive composition.

The composition was tested with respect to physical properties, stability and adhesion performance. The results are:

| | |
|---|---|
| Initial viscosity | 55,000 (mPa · s) |
| Thixotropy index | 6.3 |
| Dispersibility (Compatibility) | 30 (seconds) |
| Set time | 40 (seconds) |
| Tensile shearing strength | 180 (kgf/cm$^2$) |
| Viscosity stability | 9 (days) |
| After being stored for six months: | |
| Viscosity | 57,000 (mPa · s) |
| Thixotropy index | 6.5 |
| Set time | 40 (seconds) |

This adhesive composition had excellent performance as shown above; neither separation nor spinnability was observed.

[Testing method]

1. Initial viscosity

JIS K 6833 (BH type viscometer,No. 7 rotor, 20 rpm)
2. Thixotropy index

JIS K 6833 (BH type viscometer, No. 7 rotor ratio of 2 rpm to 20 rpm)
3. Dispersibility (Compatibility)

To a beaker are added α-cyanoacrylate and a thickener with or without a quick curing additive before ultrafine anhydrous silica is added. The mixture is dispersed with a disperser (1500 rpm) and the period of time (seconds) until uniform dispersion is realized is measured.
4. Set time JIS K 6861. Steel/steel adhesion is measured. Unit: seconds
5. Tensile shearing strength JIS K 6861. Steel/steel adhesion is measured.
6. Viscosity stability Adhesive composition(3 g, not stored after preparation) filled in an aluminum tube (4 cc) is kept at 100° C. The days until gelation occurs is measured (acceleration test).
7. Separability Adhesive composition placed in a polyethylene container (500 cc) is left at room temperature for 6 months. Then, whether or not the separation occurs is observed.
8. Spinnability A spatula inserted in an adhesive composition which had been left to stand for 6 months at room temperature was raised in order to see stinginess.

Comparative Examples 1–5

Example 1s were repeated to prepare adhesive compositions except that thickeners which do not meet our specified requirements with respect to molecular weight and amount were used.

The results are shown in Table 1 together with those of Example 1.

TABLE 1

| | Example | Comparative Examples | | | | |
|---|---|---|---|---|---|---|
| | 1 | 1 | 2 | 3 | 4 | 5 |
| MMA/MA | | | | | | |
| MW (× 10$^4$) | 15 | 5 | 40 | 100 | 15 | 15 |
| AMT (% by weight) | 14 | 14 | 14 | 14 | 5 | 30 |
| PTY | | | | | | |
| 1. DSP (sec) | 30 | 40 | 90 | 120 | 20 | 90 |
| 2. STT (sec). | 40 | 50 | 50 | 60 | 40 | 80 |
| 3. VCS (days) | 9 | 8 | 7 | 6 | 9 | 6 |
| 4. SPT | No | No | Yes | Yes | Yes | No |
| 5. SNA | No | Yes | No | No | No | Yes |

Notes:
MMA/MA: Methyl methacrylate/Methyl acrylate copolymer
MW: Molecular weight
AMT: Amount of addition
PTY: Properties of the composition
DSP: Dispersibility
STT: Set time (initial)
VCS: Viscosity stability
SPT: Separability
SNA: Spinnability

EXAMPLE 2

To ethyl-α-cyanoacrylate (100 parts by weight) containing 30 ppm of $SO_2$ and 2,000 ppm of hydroquinone were first added methyl methacrylate/methyl acrylate (100/1) copolymer (12 parts by weight, weight average molecular weight: 200,000 a thickener) and monomethacrylate of polyethylene glycol (400) monomethyl ether (0.1 part by weight, a quick curing additive). After being thoroughly stirred, Aerosil 200 (5 parts by weight) was added. The mixture was uniformly dispersed with a disperser to prepare an adhesive composition.

The composition was tested in the same manner as in Example 1.

The results:

| The results: | |
|---|---|
| Initial viscosity | 50,000 (mPa · s) |
| Thixotropy index | 6.0 |
| Dispersibility (Compatibility) | 40 (seconds) |
| Set time | 50 (seconds) |
| Tensile shearing strength | 190 (kgf/cm$^2$) |
| Viscosity stability | 9 (days) |
| After stored for six months: | |
| Viscosity | 55,000 (mPa · s) |
| Thixotropy index | 6.2 |
| Set time | 50 (seconds) |

This adhesive composition had excellent performance as shown above; neither separation nor spinnability was observed.

Compatrative Examples 6–10

Example 1s were repeated except that thickeners which do not meet our specified requirements were used.

The results are shown in Table 2 together with those of Example 2.

TABLE 2

|  | Example | Comparative Examples | | | | |
|---|---|---|---|---|---|---|
|  | 2 | 6 | 7 | 8 | 9 | 10 |
| MMA/MA | | | | | | |
| MW (× 10$^4$) | 20 | 5 | 40 | 100 | 20 | 20 |
| AMT (% by weight) | 12 | 12 | 12 | 12 | 5 | 30 |
| PTY | | | | | | |
| 1. DSP (sec) | 40 | 40 | 80 | 110 | 30 | 110 |
| 2. STT (sec) | 50 | 60 | 60 | 70 | 50 | 90 |
| 3. VCS (days) | 9 | 9 | 8 | 7 | 9 | 6 |
| 4. SPT | No | No | Yes | Yes | Yes | No |
| 5. SNA | No | Yes | No | No | No | Yes |

EXAMPLE 3

To ethyl-α-cyanoacrylate (100 parts by weight) containing 30 ppm of SO$_2$ and 2,000 ppm of hydroquinone were added a methyl methacrylate/methyl acrylate (100/3) copolymer (14 parts by weight, a weight average molecular weight: 150,000, a thickener) and monomethacrylate of polyethylene glycol (400) monomethyl ether (0.1 part by weight, a quick curing additive). After being throughly stirred, Aerosil R202 (5 parts by weight) was added. The mixture was uniformly dispersed with a disperser, to prepare an adhesive composition. The composition was tested in the same manner as in Example 1.

The results:

| Initial viscosity | 48,000 (mPa · s) |
|---|---|
| Thixotropy index | 6.0 |
| Dispersibility (Compatibility) | 30 (seconds) |
| Set time | 20 (seconds) |
| Tensile shearing strength | 180 (kgf/cm$^2$) |
| Viscosity stability | 10 (days) |
| After stored for six months: | |
| Viscosity | 50,000 (mPa · s) |
| Thixotropy index | 6.1 |
| Set time | 20 (seconds) |

This adhesive composition had excellent performance as shown above; neither separation nor spinnability was observed.

Comparative Examples 11–15

Example 1s were repeated except that thickeners which do not meet our requirements were used. The results are shown in Table 3 together with those of Example 3.

TABLE 3

|  | Example | Comparative Examples | | | | |
|---|---|---|---|---|---|---|
|  | 3 | 11 | 12 | 13 | 14 | 15 |
| MMA/MA | | | | | | |
| MW (× 10$^4$) | 15 | 5 | 40 | 100 | 15 | 15 |
| AMT (% by weight) | 14 | 14 | 14 | 14 | 5 | 30 |
| PTY | | | | | | |
| 1. DSP (sec) | 30 | 40 | 90 | 120 | 20 | 90 |
| 2. STT (sec) | 20 | 30 | 30 | 40 | 20 | 50 |
| 3. VCS (days) | 10 | 8 | 7 | 6 | 9 | 6 |
| 4. SPT | No | No | Yes | Yes | Yes | No |
| 5. SNA | No | Yes | No | No | No | Yes |

What is claimed is:

1. An α-cyanoacrylate adhesive composition which comprises (a) 100 parts by weight of an α-cyanoacrylate compound, (b) 10 through 20 parts by weight of (I) polyalkyl methacrylates having a weight average molecular weight of 100,000 through 300,000, or (II) copolymers of alkyl methacrylates and other methacrylates or acrylates, said copolymers having the same weight average molecular weight as that of the polyalkyl methacrylates (I), (c) 2 through 20 parts by weight of ultrafine anhydrous silicas, and (d) 0.001 through 20 parts by weight of quick curing additives represented by the following formula (1), (b)–(d) being on the basis of (a) 100 parts by weight of α-cyanoacrylate compounds:

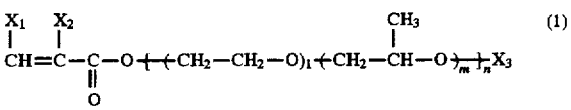

$$CH=C-C-O+(CH_2-CH_2-O)_l+(CH_2-CH-O\frac{}{m})_nX_3 \quad (1)$$

wherein X$_1$ is a hydrogen atom or methyl group; X$_2$ is a hydrogen atom, methyl group or cyano group; X$_3$ is R$_2$ or R$_2$CO in which R$_2$ represents a hydrocarbon residue containing no anionically polymerizable group; and l, m and n integers and (l+m)≧1 and n ≧1.

2. An α-cyanoacrylate adhesive composition according to claim 1, wherein 0.005 through 5 parts by weight of the quick curing additives represented by the formula (1) are contained.

3. An α-cyanoacrylate adhesive composition according to claim 1 or 2, wherein the polyalkyl methacrylates (I) or the copolymers (II) of alkyl methacrylates and other methacrylates or acrylates are polymethyl methacrylate or copolymers of methyl methacrylate and other methacrylates or acrylates.

4. A α-cyanoacrylate adhesive composition according to claim 1 or 2, wherein the weight average molecular weight of said polyalkyl methacrylates or said copolymers of alkyl methacrylates and other methacrylates or acrylates is 120,000 through 200,000.

5. An α-cyanoacrylate adhesive composition according to claim 4, wherein the amount of the polyalkyl methacrylates or copolymers of alkyl methacrylates and other methacrylates or acrylates is 12 through 17 parts by weight on the basis of 100 parts by weight of the α-cyanoacrylate compounds.

6. An α-cyanoacrylate adhesive composition according to claim 1 or 2, wherein the amount of the polyalkyl methacrylates or copolymers of alkyl methacrylates and other methacrylates or acrylates is 12 through 17 parts by weight on the basis of 100 parts by weight of the α-cyanoacrylate compounds.

* * * * *